H. A. SCHROEDER.
HOSE CLAMP.
APPLICATION FILED JUNE 22, 1921.
1,407,583.
Patented Feb. 21, 1922.
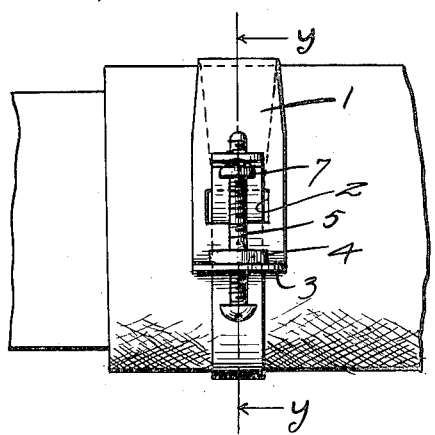
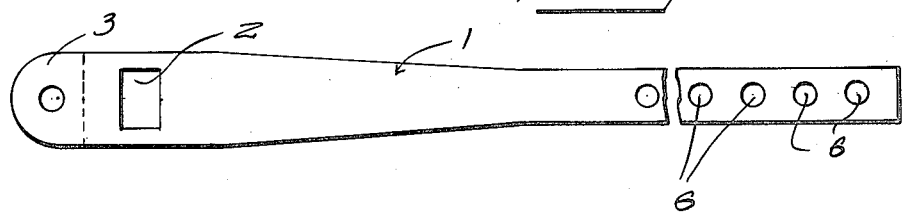
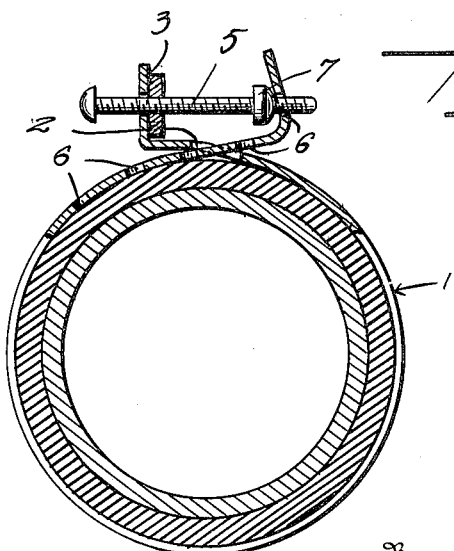
Inventor
H.A. Schroeder
By
Attorney

UNITED STATES PATENT OFFICE.

HENRY A. SCHROEDER, OF CHICAGO, ILLINOIS.

HOSE CLAMP.

1,407,583.  Specification of Letters Patent.  Patented Feb. 21, 1922.

Application filed June 22, 1921. Serial No. 479,546.

*To all whom it may concern:*

Be it known that I, HENRY A. SCHROEDER, a citizen of the United States, residing at Chicago, in the county of Cook and State of Illinois, have invented certain new and useful Improvements in Hose Clamps; and I do hereby declare the following to be a full, clear, and exact description of the invention, such as will enable others skilled in the art to which it appertains to make and use the same.

The hose connections between the radiator and water cooled jacket of an internal combustion engine are usually made secure by encircling clamps. These clamps usually provide a gap at the joint which is spanned by a bridge piece formed with or separate from the clamp. Such clamps embody loose parts which are liable to displacement or are difficult of adjustment when placing the clamps in position.

The present invention provides a hose clamp which completely encircles the hose and which is readily adjustable to any size hose since it is constructed for a hose of maximum size and may be easily and quickly reduced to fit a smaller size hose.

For a full understanding of the invention and the merits thereof reference is to be had to the following description and the drawings hereto attached in which corresponding and like parts are referred to in the specification and indicated in the several views of the drawings by corresponding and like reference characters.

Referring to the drawing hereto attached, Figure 1 is a top plan view of the hose clamp applied.

Figure 2 is a plan view of the clamp extended, and

Figure 3 is a sectional detail on the line *y—y* of Figure 1.

The clamp consists of a metal band 1 of a length to encircle the largest size hose. One end of the band 1 is widened and formed with an opening 2 and has its terminal portion upturned as indicated at 3. A nut 4 is placed against the inner side of the upturned or offstanding end 3 and receives a screw 5 which passes through an opening formed in the part 3 and is disposed with its head outermost. The opposite end portion of the band 1 is provided with a plurality of openings 6 in the length thereof. The screw 5 is provided near its outer end with a shoulder 7 which constitutes a stop or abutment, the outer side of which is made rounding or convex to readily adapt itself to the direction of strain when tightening the clamp. The part 7 preferably consists of a nut secured upon the end portion of the screw 5 a short distance from the extremity thereof.

When applying the clamp, the band 1 is bent about the hose and its end portion is passed upwardly through the opening 2 and adjusted so that the projecting end of the screw 5 engages one of the openings 6 and upon turning the screw 5 to tighten the clamp the band 1 is drawn closely about the hose thereby clamping the same as will be readily understood. If desired the projecting end of the band 1 may be removed or may be bent so as to lie close against the clamp.

Having thus described the invention, what I claim is:—

1. A hose clamp, consisting of a metal band having one end upturned and its opposite end portion provided in its length with a plurality of openings, and having the upturned end portion widened and provided with an opening adjacent the upturned end for the opposite end portion of the band to pass through, and a screw mounted in the upturned end of the band and having a shoulder adjacent its end to form a stop, said screw serving to draw the band about the hose and hold the same when tightened.

2. A hose clamp, comprising a metal band having an end portion widened and formed with an opening and having the terminal of the widened end upturned and apertured, the opposite end portion of the band being provided in its length with a plurality of openings, a nut placed against the inner side of the upturned end of the band, and a screw mounted in the upturned end of the band and engaging said nut and provided near its end with a shoulder forming a stop which is adapted to cooperate with the opposite end portion of the band when passed upwardly through the opening in the widened end thereof.

In testimony whereof I affix my signature in presence of two witnesses.

HENRY A. SCHROEDER.

Witnesses:
 EDWARD J. KLEIN,
 PHILIP F. KSYCKI.